United States Patent [19]

Blüthgen

[11] Patent Number: 4,750,173
[45] Date of Patent: Jun. 7, 1988

[54] METHOD OF TRANSMITTING AUDIO INFORMATION AND ADDITIONAL INFORMATION IN DIGITAL FORM

[75] Inventor: Björn Blüthgen, Celle, Fed. Rep. of Germany

[73] Assignee: Polygram International Holding B.V., Baarn, Netherlands

[21] Appl. No.: 866,032

[22] Filed: May 21, 1986

[30] Foreign Application Priority Data

May 21, 1985 [DE] Fed. Rep. of Germany ....... 3518234
Jul. 3, 1985 [DE] Fed. Rep. of Germany ....... 3523809

[51] Int. Cl.$^4$ .............................................. H04J 3/02
[52] U.S. Cl. ..................................... 370/111; 370/118
[58] Field of Search ................... 370/111, 110.1, 110.4, 370/118

[56] References Cited

U.S. PATENT DOCUMENTS 4,354,265 10/1982 Nyberg et al. ....................... 370/111
4,377,860 3/1983 Godbole .............................. 370/111

FOREIGN PATENT DOCUMENTS 2063018 5/1981 United Kingdom ................ 370/111

Primary Examiner—Douglas W. Olms
Attorney, Agent, or Firm—Algy Tamoshunas; Marianne R. Rich

[57] ABSTRACT

The invention relates to a method of transmitting audio information in digital form, in which for the transmission of additional information in digital form data bits of said additional information replace one or a plurality of least significant bits in every $n^{th}$ code word of the audio information. For this purpose one or a plurality of least significant bits of the audio information in every $n^{th}$ code word is/are replaced in predetermined manner by additional information bits, the number of bits being replaced depending on the value of the instantaneous code word of the audio information. This dependence is such that for larger values of the audio information more bits are replaced than for smaller values.

7 Claims, 5 Drawing Sheets

METHOD OF TRANSMITTING AUDIO INFORMATION AND ADDITIONAL INFORMATION IN DIGITAL FORM

The invention relates to a method of transmitting audio information in digital form, in which a predetermined number of code words each represent a sample of an analog audio signal and in which, for the transmission of additional information in digital form, one or a plurality of least significant bits of each $n^{th}$ code word of the digital audio information is/are replaced by data bits of said additional information, n being a positive integer.

During the processing, storage, reproduction and transmission of digital wide-band signals it is generally not possible to modify the predetermined format of the signal to be processed, stored, reproduced or transmitted in order to accommodate additional information. This is often required in the transmission of digital audio information, for example when such information is stored on optically readable disc-shaped information carriers, such as Compact Discs. It is then frequently desirable to transmit information, such as for example characters or pictures, in addition to the digital audio data. Since for example in the case of such an information carrier, the recording method and the method of encoding all the information have already been laid down, the additional information should be accommodated in the existing transmission channels.

In the prior art one or some of the least significant bits of a digital information signal is/are therefore replaced by data of the additional information. This is possible in various ways. For example, from EP-A No. 058 482 it is known to employ at least two of the least significant bits of the samples of the audio information for the transmission of additional information, one of the bits representing the data and the other bit being a check bit. This substitution of the original data is effected in each code word, i.e. in each sample.

Further, GB-A No. 2,063,018 describes a system of transmitting digital samples of a speech signal in which the least significant bit in each sample is replaced by a bit of the additional information.

Thus, in both methods one or some of the least significant bits of the audio information is/are replaced by data bits of the addition information. However, these methods only enable comparatively small amounts of additional information to be transmitted and if the level of the audio signal is very low the possibility of disturbances cannot be excluded completely because then almost only additional information is transmitted via the audio channels and may become audible during reproduction.

DE-OS No. 28 04 150 describes a method of transmitting pulse-code-modulated analog signals, in which in each subframe a bit of the additional information takes the place of the least significant bit of the sample in the code word having the smallest absolute amplitude. However, this method is likely to give rise to very strong audible disturbances in the audio channel because the additional information is transmitted over the audio channel at critical positions, i.e. where the level of the audio signal is low, so that the additional information becomes audible.

SUMMARY OF THE INVENTION

It is the object of the invention to provide a method of transmitting additional information in digital form over a digital audio channel in such a way that a maximum amount of additional information can be transmitted with a minimal acoustic disturbance of the audio channel.

According to the invention this object is achieved in a first embodiment in that in every $n^{th}$ code word one or a plurality of least significant bits of the audio information are replaced by bits of the additional information in a predetermined manner, the number of bits being replaced depending on the encoded amplitude value of the relevant code word of the audio information in such a way that when larger predetermined reference values are exceeded more bits are replaced than when smaller predetermined reference values are exceeded.

Thus, in accordance with this method one or a plurality of least significant bits of the audio information are replaced by bits of the additional information in every $n^{th}$, suitably every second, code word. This is effected in such a way that the number of bits being replaced depends on the encoded amplitude value of the digital audio signal. The encoded amplitude value of the digital audio signal corresponds to an analog voltage value of the audio signal which is reconverted into an analog signal at the receiving side of the system. Thus, in the case of comparatively large encoded amplitude values of the digital audio signal or, in analog terms, for comparatively high voltages, one or a plurality of least significant bits of the audio information are replaced by data bits of the digital information. As a result of this, the additional information is not transmitted, or only very occasionally, when the level of the analog audio signal is very low and the encoded amplitude values of the digital audio signal are correspondingly small. The number of least bits being replaced in each $n^{th}$ code word increases as the level of the analog signal increases, which results in corresponding encoded amplitude values of the digital audio signal. The parameters may then be selected freely but should be the same before and after the transmission channel, i.e. after analog-to-digital conversion and before digital-to-analog conversion.

In a modification of the inventive method when predetermined values of the code words are exceeded one or a plurality of least significant bits of the digital audio information are replaced by bits of the additional information in a predetermined manner not only in each $n^{th}$ code word but also in the other code words, depending on the magnitude of the encoded amplitude value, which is exceeded in such a way that when larger predetermined reference values are exceeded more bits are replaced than when smaller predetermined reference values are exceeded, which smaller predetermined reference values are at least substantially larger than the reference values for which the least significant bits in each $n^{th}$ code word are replaced.

The substitution of the least significant bits in every $n^{th}$ code word described above may also be reflected in the intermediate words. Again the number of least significant bits of the audio signal being replaced by bits of the additional information increases as the level of the audio signal increases. Acoustically it is found to be advantageous if first of all in each $n^{th}$ code word for example one or two least significant bits are replaced and larger predetermined reference values are selected for the insertion of further bits in the intermediate code words, so that when the level of the audio information increases initially, for example, the two least significant bits in every $n^{th}$ code word are replaced and when said level increases further first one, two and then, for example, a maximum of three least significant bits of the other code words containing the digital audio information are replaced by data bits of the additional information.

In a further modification of the inventive method a clock-pulse counter for the number n is restarted each time that fixed predetermined values of the code words appear and proceeds to count cyclically until the next appearance of the predetermined code words which start the clock-pulse counter again.

The identification of those code words in which least significant bits are to be replaced by data bits requires some kind of synchronisation. This is effected in such a way that for predetermined values of the code words or predetermine sequences of code-word values the clock-pulse counter for the identification of the manipulated code words is restarted. This means, for example, that when a specific code word or a specific code-word sequence is identified the clock-pulse counter is restarted and, starting from this code word, the least significant bits in every $n^{th}$ code word are replaced by data bits. When the predetermined values of the code words or a predetermined sequence of code words appears again the clock-pulse counter is started again so that the clock-pulse counter is always re-synchronised and possible faults in the transmission and consequent incorrect identification of the code words can have an adverse effect for a limited time interval only, namely until the next re-synchronisation of the clock-pulse counter.

In a further modification of the inventive method the data bits of the additional information are separated from the data bits of the audio information after transmission and the vacated bit positions of the audio information are filled with bits from a digital noise oscillator.

This method utilises the masking effect of the ear in order to transmit additional information. As a result of this masking effect small disturbances are audible less distinctly at comparatively high levels of an audio signal. Under specific circumstances, however, it may be advantageous not to leave the additional information inserted into the audio information in the audio signal but to replace it by another signal. In this respect a noise signal is found to be advantageous. Generally, the substitution of data bits by, for example, noise signals is not necessary when the bits of the additional information are distributed in such a way that their acoustic impression on the ear is the same as that of a noise signal.

A second embodiment of the invention relates to a method of transmitting audio information in digital form, in which a predetermined number of code words each representing a sample of an analog audio signal, together with synchronising information (block synchronisation), subcode information and, if desired, error-code information are combined to form blocks of fixed predetermined length and in which for the additional transmission of additional information in digital form the data bits of said additional information replace one or a plurality of least significant bits in each $n^{th}$ code word of the digital audio information, n being a positive integer.

The method is characterized by the following steps:
A. at the system input side, a. dividing the successive code words of the main information in a block into a plurality of identical code-word groups comprising code words which succeed each other directly, b. dividing each code-word group into code words whose information content is invariable (reference code words) and into variable code words (mixed code words), the reference code words preferably constituting the beginning of a code-word group, c. replacing a number of least significant bits of the mixed code words by bits of suitably encoded additional information which number of bits to be replaced may be a predetermined number or a number which depends on the value of the digital audio information, more bits being replaced in the case of larger values than in the case of smaller values, B. at the system output side, a. detecting the temporal position of the reference code words and the mixed code words of the code word groups by means of the block synchronisation, b. separating the bits representing the additional information from the mixed code words and filling the vacated bit positions with bits of suitable significance from a substitution auxiliary-signal source, c. decoding the reconstructed code words of the main information and of the additional information recovered from the mixed code words.

This method aims at accommodating a maximum amount of additional information within a predetermined signal format of, for example, a digital audio disc (CD). For this purpose, a number of least significant bits of the mixed code words are replaced by bits of suitably encoded digital information, the number of bits replaced being a predetermined number or a number which depends on the value of the digital audio information. At the reproduction side the additional information is extracted and the vacant bit positions are filled with bits of a suitable significance from a substitution auxiliary signal source.

In the case of digital information discs, for example Compact Discs, this method enables, for example, additional picture information to be transmitted over the transmission channel intended for the audio information. As the output side of the system the code words of the main information which have been modified to transmit the additional information byte bits of suitable significance from a substitution auxiliary source, although said modification is not likely to become audible.

Embodiments of the invention will now be described in more detail, by way of example, with reference to the accompanying drawings.

BRIEF DESCRIPTION OF THE FIGURES

FIGS. 1 and 2 are block diagrams of a circuit arrangement operating in accordance with the first embodiment of the invention. FIG. 1 shows a part of the circuit arrangement in which additional digital information is inserted into the digital audio signals before transmission. For this purpose the digital audio signal 1 is first applied to a synchronising stage 2. This synchronising stage 2 detects the presence of specific predetermined code words or specific predetermined code-word sequences in the digital audio signal. If such a code word or such a code-word sequence is detected the synchronising stage 2 supplies a corresponding signal to the detection stage via its output 3. Such a signal is generated each time that a code word appears in which the audio signal bit is to be replaced by data signal bits. The detection stage 4, which also receives the digital audio signal via an input, determines the value for each code word. In the case of coincidence of a code word, which exceeds a specific predetermined value and which in addition has been identified as a code word by the synchronising stage 2, i.e. a code word in which some bits should be replaced by data bits, the detection stage 4 supplies an appropriate signal from its output 5 to the computing circuit 6. In general the detection stage 4 is constructed in such a way that it operates for a plurality of different stages and supplies correspondingly marked signals to the computing stage 6. By means of a signal 7 from the output of the computing stage 6 a switch 8 is controlled in such a way that for code words in which one or a plurality of least significant bits of the audio information should be replaced by bits of the data information a signal is applied to a switching device 8, which signal also indicates how many of the least significant bits of the relevant code word should be replaced by data bits. In the switching device 8 these bits of the digital audio signal are then replaced by bits of the additional digital information 9. In the code words then appearing on the output 10 of the switching device 8 the least significant bits of the audio information have been replaced by bits of the additional digital information. After the output 10 these code words are passed through the transmission channel. This transmission channel may be of a wide variety of types; it may be, for example a PCM radio transmission, a recording on PCM audio tape, a recording on a digital optically readable disc or the like.

FIG. 2 shows a part of the block diagram of the circuit arrangement in which the signal obtained from the transmission channel and containing the additional information is decoded, i.e. from which the data of the digital information is extracted and in which if desired, the corresponding positions of the audio information are filled with other data.

Figure 1:
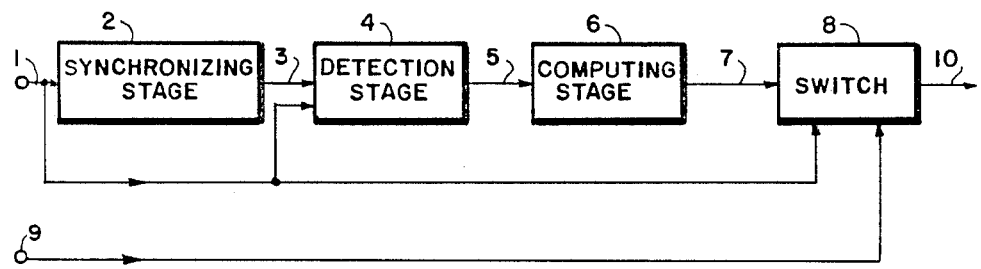
FIG. 1 shows the block diagram of a circuit arrangement for inserting additional information into digital audio information in accordance with a first embodiment of the invention.
Figure 2:
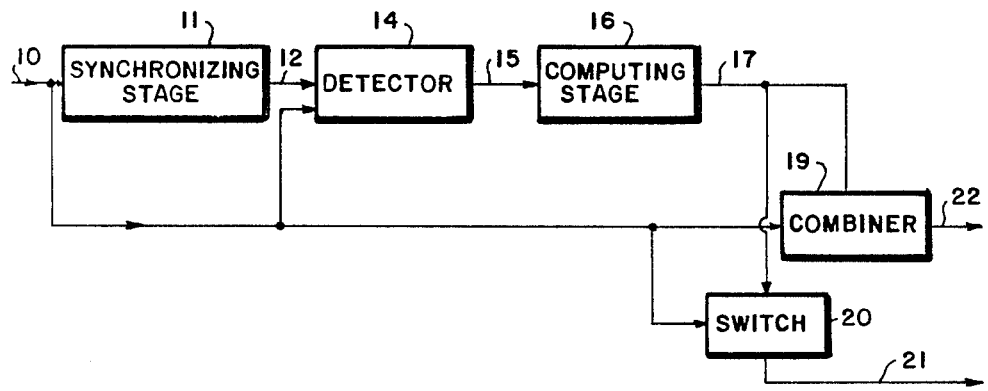
FIG. 2 is a block diagram of the embodiment shown in FIG. 1, but now for the reproduction side.

The signal 10 from the transmission channel is first applied to a synchronising stage 11. This synchronising stage 11 operates in exact the same way as the synchronising stage 2 preceding the transmission channel. Thus, this stage also identifies specific code words or code-word sequences among the code words being transmitted and in the case of identification it supplies a corresponding pulse 12 to a detector 14. The operation of this detector 14 is identical to that of the detector 4 of the circuit arrangement employed before transmission. The detector also receives the digital signal 10 from the transmission channel. The detector determines the value of a code word identified by the synchroniser 11 and supplies a corresponding signal 15 to the computing stage 16. From the value of the relevant code word this stage, in the same way as the computing stage 6 of the circuit arrangement of FIG. 1, determines the number of bits in which additional information has been substituted for the digital audio information bits. The computing stage 16 supplies an output signal 17 to a switching device 20 and a combiner 19. The switching means 20 is controlled by the computing stage in such a way that the additional information appears on an output 21 of the switching device. This is achieved in that in the switching device 20 the bits not representing the digital audio information but the additional digital information are extracted to become available as a signal 21 which contains only the additional digital information. In addition to the output signal 17 of the computing stage 16 the combiner 19 receives the digital signal 10 from the transmission channel. In the combiner 19 the bits extracted in the switching device 20 are replaced by new bits. Suitably, these bits may be generated by means of a digital noise source. Thus, the output signal 22 of the combiner 19 again comprises the original digital audio information on which a subjectively non-disturbing noise signal is superimposed at the position where the additional information has been inserted during transmission.

Figure 3:
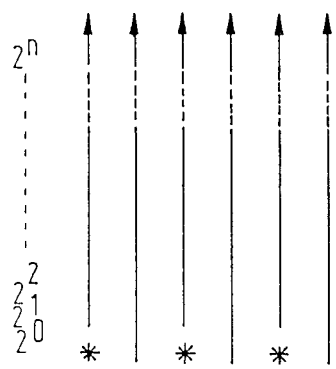
FIGS. 3 to 6 show some examples of the insertion of additional information into code words of the audio information in accordance with the first embodiment of the invention.
Figure 4:
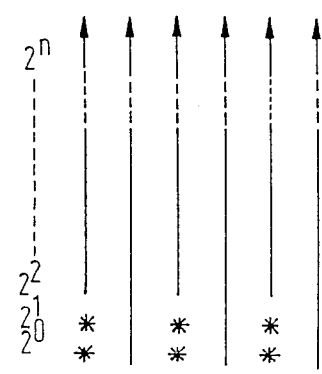
Figure 5:
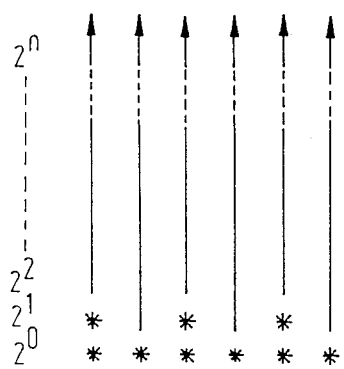
Figure 6:
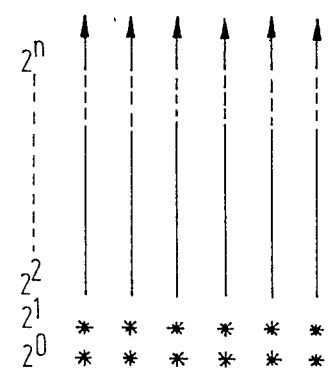

FIGS. 3 to 6 show schematically how one or a plurality of least significant bits of a code word sequence or of individual code words can be replaced in accordance with a first embodiment of the invention. Each time six successive code words each with a least significant bit $2^0$ up to a most significant bit $2^n$ are shown schematically. The bit positions marked with an asterisk represent locations where the bits of the digital audio information should be replaced. The situation shown in FIGS. 3, 4, 5 and 6 corresponds to increasing values of the digitally encoded audio signal. Thus, FIG. 3 illustrates the insertion of additional information as may be applied, for example, in the case of comparatively small values of the audio signal. Initially the least significant bit ($2^0$) in every second code word is replaced. As the level increases, as is shown in FIG. 4, the two least significant bits ($2^0$ and $2^1$) in every second code word are now also replaced. As the level increases further, the insertion scheme of FIG. 5 is obtained. In the same way as in FIG. 4, the two least significant bits in every second code word, in addition to the least significant bits of the other code words are now replaced by data bits of the additional information. FIG. 6 represents the situation in which in the present example the maximum amount of data of the additional information can be inserted. In all the code words the two least significant bits are then replaced.

It is obvious that the diagram for a method in accordance with the first embodiment of the invention as shown in FIGS. 3 to 6 merely represents one possibility. Alternatively, it is also possible, for example at an initially lower level, to replace only one bit in every third word and, as the level increases, at the most three bits in every third word. After this one bit and subsequently up to maximum three bits in the other words being transmitted may be replaced by bits from an additional information source. Many other modifications are conceivable. The choice of suitable parameters depends on the type of audio signals and on the desired freedom from acoustic interference. For example, the insertion of additional bits may be omitted in the case of an encoded amplitude value of $\leq 2^0$ in order not to disturb the audio signals and such critical low levels.

FIGS. 7 to 13 show a circuit arrangement which operates in accordance with the second embodiment of the invention.

Figure 7:
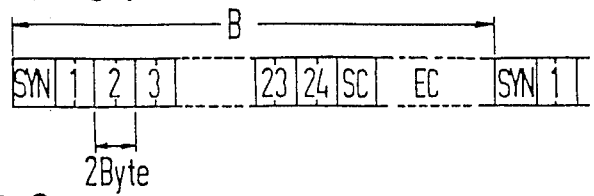
FIG. 7 shows a signal stream which is customary for digital audio signals and which is defined by successive blocks of a predetermined format, FIGS. 8 to 10 schematically represent various possibilities of inserting additional information into code words of the main information in accordance with the second embodiment of the invention.

FIG. 7 shows a linear signal stream comprising successive blocks B, each block beginning with a block synchronisation SYN followed by the code words 1, 2, 3, ... 24 of the main information. The last code word 24 of the main information is followed by sub-code information SC. The block B terminates with error-code information EC which allows some degree of error correction at the output side of the system during the recovery of the original analog main information. Suitably, as is shown in FIG. 7, the main information is arranged in code words having a length of 2 bytes.

Figure 8:
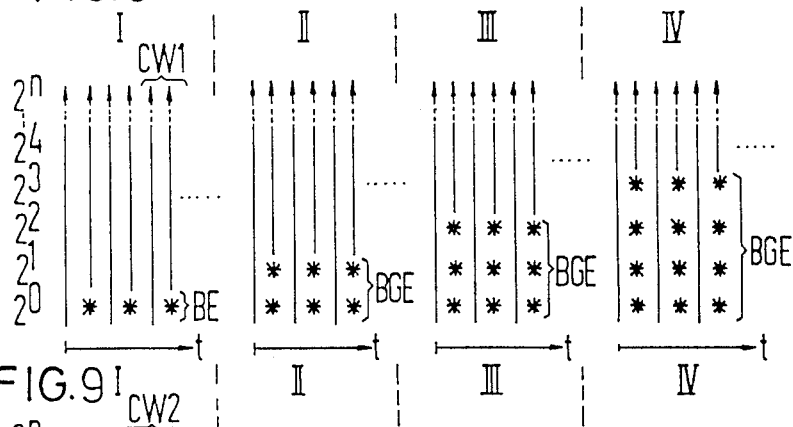
Figure 9:
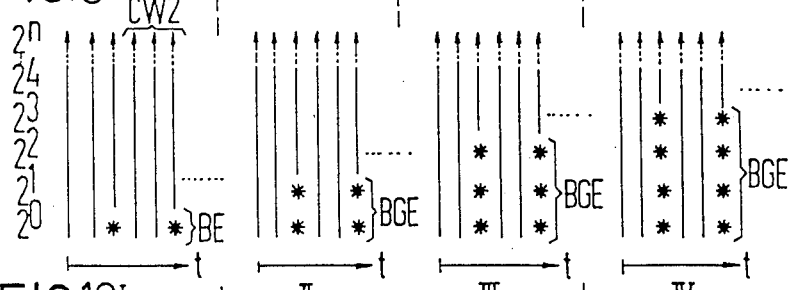
Figure 10:
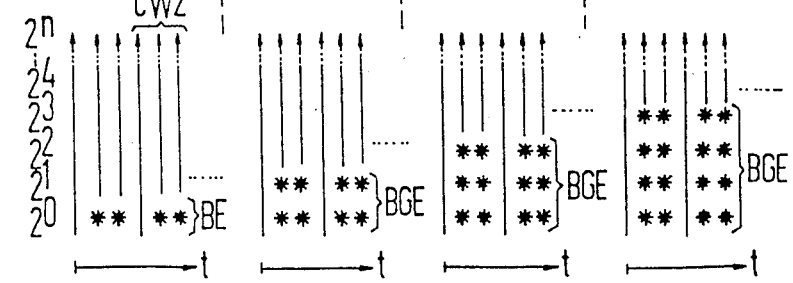

In the case of a fixed predetermined block format, as is represented by the block B in FIG. 7, the additional information to be inserted should be accommodated within the main information. FIGS. 8 to 10 schematically show various possibilities. Each of the FIGS. 8 to 10 shows four code-word-sequence portions I, II, III and IV as a function of time t. The code words of the actual main information with increasing significance $2^0$, $2^1$, $2^2$, $2^3$, $2^4$, ... $2^n$ of their bit positions are indicated by arrows which point upwards.

In FIG. 8 it is assumed that in the code-word-sequence portions I, II, III and IV the code words of the main information are arranged as code-word groups CW1 comprising two consecutive code words. In the diagrams shown in FIGS. 9 and 10 the code-word sequence of the main information is arranged in code-word groups CW2 which each comprise three successive code words. In the code-word-sequence portion I in FIGS. 8, 9 and 10 the additional information is only inserted at the least significant bit position $2^0$ of a code word. This bit insertion is designated BE and is marked by an asterisk. In the code-word group CW1 in FIG. 8 the first code word of the code word group is thus always an invariable reference code word, whilst the variable second code word constitutes the mixed code word. If a code-word group (CW2) comprises more than two successive code words, for example three successive words as is shown in FIGS. 9 and 10, there will be various possibilities for the division into reference code words and mixed code words as the number of code words per code-word group increases. In the code-word-sequence portion I shown in FIG. 9 the first two code words of a code word group CW2 are reference code words and only the third word is a mixed code word. In the corresponding code-word-sequence portion I in FIG. 10 the first code word is a reference code word and the second and third code words of the code-word group CW2 are mixed code words. The code-word-sequence portions II, III and IV differ from the code-word-sequence portion I in FIGS. 8, 9 and 10 only in that in each mixed code word more than one bit of the additional information is inserted. The bit-group insertion is designated BGE. In the code-word-sequence portion II the bit positions $2^0$ and $2^1$ of the mixed code words contain additional information. In the code-word-sequence portion III the bit-group insertion is effected at the bit positions $2^0$ to $2^1$ and $2^2$ and in the code-word-sequence portion IV this is effected the four least significant bit positions $2^0$, $2^1$, $2^2$ and $2^3$.

The possibilities illustrated in FIGS. 8, 9 and 10 of inserting the additional information into the successive code words of the main information are only a small selection of the available possibilities. As already pointed out, the variation possibility increases as the number of code words combined to form a code word group increases. In the case of several mixed code words within a code-word group it is in principle also possible to employ different numbers of least-significant bit positions for the insertion of additional information bits. Further, it is possible to make the number of additional information bits to be inserted dependent on the value of the main information.

Figure 11:
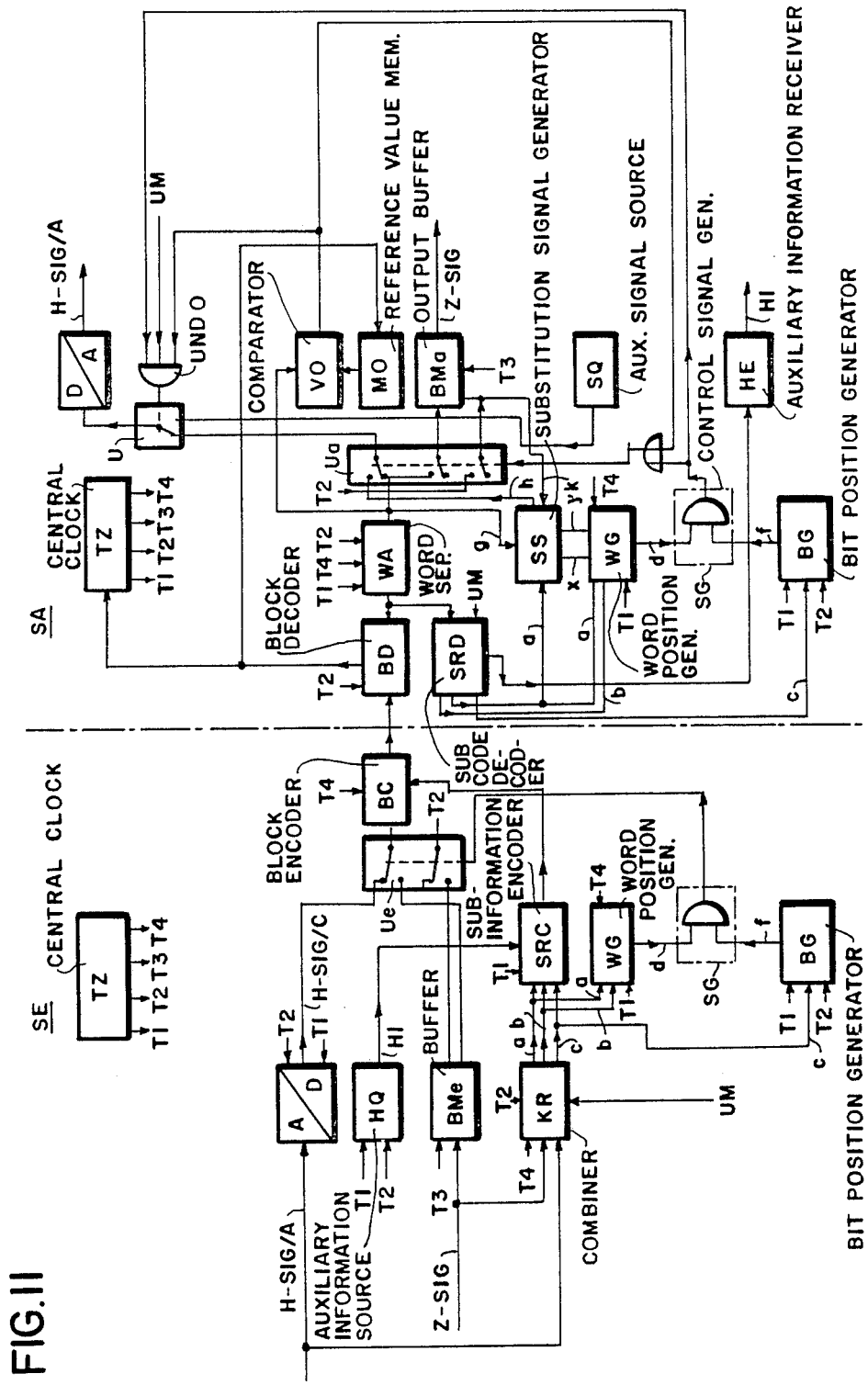
FIG. 11 is a block-schematic representation of the input side and the output side of a system employing the method in accordance with a second embodiment of the invention.

As shown in FIG. 11 the input side SE and the output side SA of the system for carrying out the steps outlined with reference to FIGS. 8 to 10 in order to insert additional information into a predetermined block format in accordance with the second embodiment of the invention each comprise a central clock TZ supplying word clock pulse train for the main information, a bit clock pulse train T2 for the main information, a bit clock pulse train T3 for the additional information and a block synchronising-pulse train T4. The use of these clock-pulse trains in the individual sections is each time indicated by an arrow marked with the reference for the relevant clock-pulse train. The analog main information H-SIG/A is applied to the input of the analog-to-digital converter AD from whose output the digital main information H-SIG/C is applied to the double switch Ue at the input side, i.e. to the upper switching contacts of the upper switch. The additional signal Z-SIG, which is already available in digital form, is applied to the lower switching contact of the upper switch of the double switch Ue at the input side via the input buffer BMe. Each time that in conformity with FIGS. 8, 9 and 10 one or more bits in a code word of the main information should be replaced by bits of the additional information, the double input switch Ue is switched over, so that the two switches are set to the positions not shown for the duration of the insertion process. The buffer BMe receives the bit clock pulses T2, for the main information as read-out clock pulses, while at the same time the additional information in the buffer BMe is applied to the block encoder BC via the upper switch of the double input switch Ue. The block encoder BC defines the format of the block B in conformity with FIG. 7, and, subsequently the formated digital signal becomes available for transmission to the system output side SA.

At its input the system output side SA comprises the block decoder BD followed by the word separator WA. From the output of the word separator WA, on which only the code word sequence of the main information including the additional information appears, the reference code words and the mixed code words which have been reconstructed with respect to the main information content are applied to the digital-to-analog converter D/A and the additional information is applied to the output buffer BMa by suitably controlling the multiple switch Ua at the output side. The recovered analog main information H-SIG/A is then available on the output of the digital-to-analog converter D/A and the additional digital signal Z-SIG is then available on the output of the output buffer BMa for further processing.

The double switch Ue at the system input side SE and the multiple switch Ua at the system output side SA are controlled depending on the division into code word groups of the code-word-sequence of the main information within the block B as shown in FIG. 7, the division of a code-word group into reference-code words and mixed code words, and the number of least significant bits in the code words to be mixed which should be replaced by additional information bits.

Several parts of the circuit are involved in the generation of the control signal for the double input switch Ue. One of these parts is the combiner KR which, in addition to other signals, also receives the additional digital information signal Z-SIG. The combiner KR has three output terminals a, b, c, a signal relating to the number of reference code words per code word group appearing on terminal a, a signal representing the number of code words per code-word group appearing on terminal b, and a signal representing the number of additional-information bits per mixed code word appearing on the terminal c. Alternatively, the signal c may be derived from the values of the running code words, the signal c being also selected depending on the magnitude of the values. For this purpose, the signal H-SIG/A is also applied to the combiner KR and is detected continuously to derive the signal c during identification of predetermined values of the code words. In order to change over between the two modes of generating the signal c, a signal UM is applied to the combiner KR. The output terminals a and b of the combiner KR are connected to the corresponding input terminals a and b of the word-position generator WG, which supplies a binary one from its output terminal d to one input of a control signal generator comprising an AND circuit each time that the occurrence of a mixed-code word is detected. The output terminal d of the combiner KR is connected to the corresponding input terminal c of the bit-position generator BG, on whose output terminal f, which is connected to the second input of the control-signal generator SG constituted by an AND circuit, a binary one is produced if a least significant bit of a mixed code word should be replaced by an additional information bit. Thus, the control signal generator SG always supplies a switching signal to the double input switch Ue in the desired manner if in a mixed code word either the least significant or two or more least significant bits should be replaced by additional information bits.

As can also be seen, the system input side SE also comprises the sub-information encoder SRC which at its input side receives the auxiliary information HI from a auxiliary information source HQ, as well as the signal appearing on the output terminal a, and c of the coordinator KR. The sub-information encoder RC combines the information applied to its input side to form the sub-code information SC as shown in FIG. 7, which information at its output side is transferred to the block encoder BC for insertion into the blocks B. Suitably, the sub-code information SC serves to transmit the reference and mixed code-word configuration to the system output side SA.

At the system output side SA the sub-information encoder SRD receives the sub-code information from the output of the block decoder BD and transfers the auxiliary information HI at its output side to the auxiliary-information receiver HE and further signals to the input terminals a, b, c of the word-position generator WG and the bit-position generator BG. These further signals correspond to the signals on the output terminals a, b and c of the coordinators KR at the system output side SA. Again there are two modes of operation, namely the insertion of a predetermined fixed number of least significant bits into a code word and the insertion of a number of bits depending on the value of the code word. In the same way as the combiner KR at the input side a switching signal Um is applied to the sub-information decoder RD at the system output side, which signal controls the change-over between the two modes of operation to compute the signal c. Thus, in the same way as at the system input side SE, it is achieved that the control-signal generator SG always causes the multiple output switch Ua to change over if a bit position of a mixed code word is occupied by an additional information bit. By means of the central switching contact of the multiple output switch Ua the additional information is derived from the mixed code words and applied to the output buffer BMa. At the same time the lower switching contact of the multiple output switch Ua ensures that when an additional-information bit is applied to the output buffer BMa of the bit-clock pulse train T2 of the main information is applied to the output buffer BMa as a read-in clock. The bit-clock pulse train T3 for the additional information functions as the read-in clock for the output buffer BMa, so that the additional digital signal Z-SIG can be taken continuously from the output.

At the instants at which the additional-information bits are applied to the output buffer BMa substitution bits of suitable significance from the substitution source SQ can be inserted simultaneously into the mixed code words. The bits to be inserted into the mixed code words to replace the additional information bits for the reconstruction of the mixed code words may be bits of suitable significance supplied by a substitution auxiliary signal source, for example a dither oscillator.

This is effected by means of the switch U, by which the input of the digital-to-analog converter DA can be connected selectively to the upper switching contact of the multiple output switch Ua or to the output of the substitution auxiliary-signal source SQ. In the mode in which the number of least significant bits to be replaced depends on the instantaneous encoded amplitude value of the code words, the switch U is controlled via the output of the AND circuit UND 0, to whose first input the signal from the output of the control signal generator SG is applied to whose second input the output signal from the comparator VO is applied, and to whose third input the signal UM for the mode selection is applied. The comparator VO compares the code words appearing on the output of the word separator WA with the reference code words or code-word-sequence criteria provided by the reference-value memory MO.

Thus, the comparator VO always supplies a binary one to the corresponding input of the AND-circuit UND 0 if that bit of a code word from the reference-value memory MO appearing on the word-separator output is identified as an additional information bit. In such a case bits of suitable significance from the substitution auxiliary-signal source are then applied to the digital-to-analog converter D/A via the upper switching contact of the multiple output switch Ua and the additional-information bits from the output of the word separator WA are applied to the output buffer BMA via the central switching contact of the switch Ua.

The bits to be replaced of the associated mixed code words appear on the output terminal h of the substitution signal generator SS in the second mode of operation. This generator receives the reference code words of the successive code-word groups from the output of the word separator via the input terminal g and the bit clock pulse train T2 of the main information via the terminal k. Further, it receives information on the number of reference-code words per code word group, necessary for the substitution, from the sub-code decoder SRD via its input terminal k. The substitution signal generator SS receives further information from the output terminals x and y of the word-position generator WG.

Figure 12:
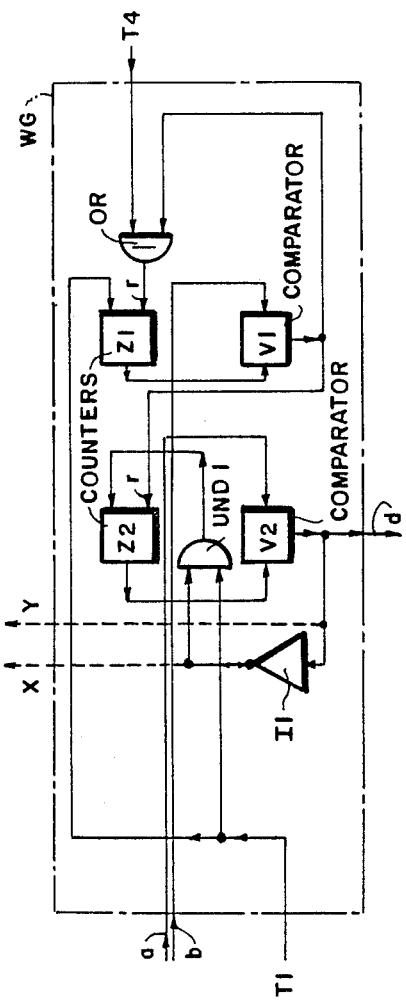
FIG. 12 is a more detailed block diagram of a word-position generator shown in FIG. 11.

FIG. 12 shows a more detailed block diagram of a word-position generator WG. It comprises two counters Z1 and Z2, two comparators V1 and V2, the OR-circuit OR, the AND-circuit UND 1, and the inverter I1. In the counter Z1, which receives the word clock-pulse train T1 for the main information at its input side, the successive code words are counted and, by means of the information on the number of code words per code-word group received via the input terminal b, the comparator V1 determines when the counter Z1 has counted a code word group. When the comparator V1 responds this results in a reset signal for the counter Z1 from the output of the comparator V1 to the reset input r of the counter Z1 via the OR-circuit OR. At the same time the output signal of the comparator V1 is applied to the reset input r of the counter Z2, whose count input is enabled as long as the clock pulses of the word clock T1 for the main information are applied via the AND circuit UND 1, as long as the comparator V2 does not respond, and consequently no output signal from this comparator is applied to the second input of the AND-circuit UND 1 via the inverter I1. The comparator V2, of which one input receives the number of reference-code words per code-word group via the input terminal a of the wordposition generator WG and whose other input receives the output signal of the counter Z2, responds when it has determined the number of reference-code words in a code word group and its output signal inhibits the counter Z2, as already stated via the inverter I1. At the same time the output signal of the comparator V2 functions as the output signal of the word position generator WG on terminal b. In other words, the output terminal d of the word generator WG is always activated during the time interval in which a mixed code word appears.

Figure 13:
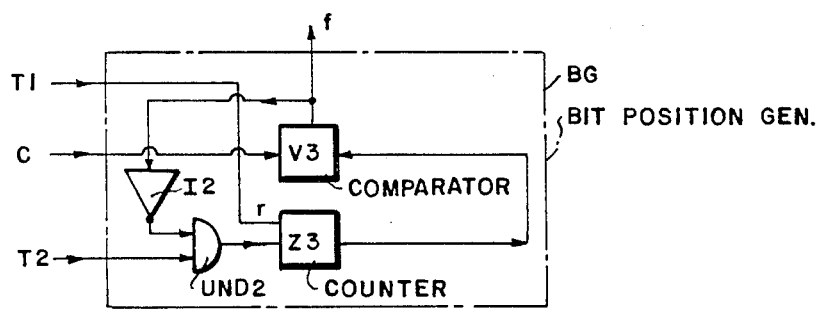
FIG. 13 is a more detailed block diagram of a bit-position generator shown in FIG. 11.

The block diagram of the bit-position generator BG shown in FIG. 13 shows a circuit arrangement similar to that of the word-position generator WG of FIG. 12. It comprises a counter Z3, a comparator V3, and AND-circuit UND 2 and an inverter I2. The word clock pulse train T1 for the main information is applied to the reset input r of the counter Z3 and resets this counter to its initial setting at the beginning of a word clock-pulse train. In the comparator V3 the output signal of the counter Z3, which counts down, is compared with the information on the input terminal c, which information represents the number of additional information bits per mixed code word, and the output of the comparator V3 is activated when this bit number is reached. At the same time the input of the counter Z3 to which the bit clock-pulse train T2 for the main information is applied via the AND-circuit UND 2 is inhibited by the output signal of the comparator V3 via the inverter I2. Thus, the output terminal f of the bit-position generator BG, which is identical to the output of the comparator V3, is always activated in the time intervals in which predetermined bit positions of mixed code words appear which should be filled with additional-information bits.

The method in accordance with the invention may be utilized in all those cases where during the processing of digital information with a predetermined block format further information is to be accommodated within said predetermined block format. The use of the method is advantageous inter alia in the case of audio information to be stored in digital form on optically readable disc-shaped information carriers, which in addition should be provided with picture information.

Legend to the Figures

B=block
SYN=block synchronisation
1, 2, . . . 24=code words
SC=sub-code information
EC=error-code information
I, II,III,IV=code-word sequence portion
CW1, 2=code-word group
BE=bit insertion
BGE=bit-group insertion
SE=system input side
SA=system output side
TZ=central clock
T1=main-information word clock
T2=main-information bit clock
T3=additional-information bit clock
T4=block synchronising pulse train
A/D=analog-to-digital converter
D/A=digital-to-analog converter
HQ=auxiliary-information source
HE=auxiliary-information receiver
HI=auxiliary information
BMe=input buffer
BMa=output buffer
H-SIG/A=analog main information
H-SIG/C=encoded main information
Ue=double switch at input side
Ua=multiple switch at output side
UM=insertion-mode switching signal
BC=block encoder
BD=block decoder
WA=word separator
Z-SIG=additional information
KR=coordinator
SQ=substitution auxiliary-signal source
U=switching device
MO=reference-value memory
SRC=sub-information encoder
SRD=sub-information decoder
SS=substitution-signal generator
WG=word-position generator
PG=bit-position generator
SG=control-signal generator
a,b,c=terminals
d,f,g,h=terminals
k,x,y=terminals
r=reset input
Z1,2,3,4=counters
V0,1,2,3=comparators
OR=OR-circuit
I1,2=inverters
UND0,1,2=AND-circuit
ROM=look-up table memory
S/0=series-parallel converter P/S=parallel-series converter
UES=transfer switch
ADD=adder
DL=delay means
DV=divider
PF=pulse shaper
SH=sample-and-hold circuit.

What is claimed is:

1. A method of transmitting digital audio information representing samples of an analog audio signal with additional digital information comprising:

generating a plurality of multibit digital words from said samples of an analog signal;

selecting a number of lower order bits in said digital words to be replaced with bits of data from said additional digital information when the amplitude of said analog signal represented by each digital word exceeds a first level;

replacing said lower order data bits of every $n^{th}$ word with bits of the additional digital information, whereby every $n^{th}$ word contains a number of bits of said additional digital information depending upon the size of said analog sample; and, transmitting each of said digital words to a receiving apparatus.

2. A method as claimed in claim 1, wherein the number n is at least 2.

3. A method as claimed in claim 1, wherein when predetermined values of the digital words are exceeded, one or more of the least significantly bits of the digital audio information are replaced by bits of the additional information in a predetermined manner in each $n^{th}$ code word and in other code words, when the magnitude of the encoded amplitude value represented by a digital word exceeds a second level greater than said first level.

4. A method as claimed in claim 1, further comprising restarting a clock-pulse counter for each time that fixed predetermined values of the digital words or sequences of a digital word occurs, and counting cyclically with said clockpulse counter until the next appearance of the predetermined code words or sequences of code words.

5. A method as claimed in claim 1, wherein during reception by said receiving apparatus, the additional information bits are separated from the data bits of the audio information and the vacated bit positions in the digital words are filled with bits from a digital noise oscillator.

6. A method of transmitting audio information in digital form, in which a predetermined number of code words each representing a sample of an analog audio signal, together with block synchronizing information, sub-code information and error-code information are combined to form blocks of fixed predetermined length, and which provides for the transmission of additional information of digital form by replacing one or a plurality of least significant bits in each $n^{th}$ code of the digital audio information, n being a positive integer, with said additional information, comprising the following steps:

a. dividing the successive code words in a block into a plurality of sequential identical code-word groups comprising code words, b. dividing each code word group into reference data words whose information content is invariable and into variable mixed code words, the reference data words constituting the beginning of a code-word group, c. replacing a number of least significant bits of the mixed code words by bits of suitably encoded additional information which number of bits to be replaced may be either a predetermined number, or a number which depends on the value of the digital audio information, so that more bits are replaced in the case of larger values of said mixed code words, d. detecting the temporal position of the reference code words and the mixed code words of the code word groups by means of the block synchronization information, e. separating the bits representing the additional information from the mixed code words and filling the vacated bit positions with bits of suitable significance from a substitution auxiliary-signal source, and f. decoding reconstructed digital code words of the original audio information and of the additional information recovered from the mixed code words.

7. A method as claimed in claim 6, wherein the substitution auxiliary-signal source is a digital dither oscillator.

* * * * *